United States Patent
Kulkarni et al.

(10) Patent No.: US 9,785,522 B2
(45) Date of Patent: Oct. 10, 2017

(54) ADAPTIVE DATACENTER TOPOLOGY FOR DISTRIBUTED FRAMEWORKS JOB CONTROL THROUGH NETWORK AWARENESS

(71) Applicant: Cisco Technology, Inc., San Jose, CA (US)

(72) Inventors: Karthik Krishna Kulkarni, Fremont, CA (US); Raghunath Nambiar, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 291 days.

(21) Appl. No.: 14/541,976

(22) Filed: Nov. 14, 2014

(65) Prior Publication Data

US 2016/0140001 A1    May 19, 2016

(51) Int. Cl.
*G06F 9/46* (2006.01)
*G06F 11/20* (2006.01)
*H04L 29/08* (2006.01)
*H04L 12/26* (2006.01)
*H04L 12/24* (2006.01)

(52) U.S. Cl.
CPC ...... *G06F 11/2033* (2013.01); *H04L 43/0817* (2013.01); *H04L 67/10* (2013.01); *G06F 2201/805* (2013.01); *H04L 41/147* (2013.01); *H04L 43/16* (2013.01)

(58) Field of Classification Search
None
See application file for complete search history.

(56) References Cited

U.S. PATENT DOCUMENTS

| | | | | |
|---|---|---|---|---|
| 8,260,840 B1* | 9/2012 | Sirota | ................... | G06F 9/5061 |
| | | | | 370/216 |
| 8,296,419 B1* | 10/2012 | Khanna | ................. | G06F 9/5072 |
| | | | | 709/201 |
| 2009/0031316 A1* | 1/2009 | Richoux | ............... | G06F 9/5066 |
| | | | | 718/102 |
| 2014/0136779 A1* | 5/2014 | Guha | .................... | G06F 9/5066 |
| | | | | 711/114 |
| 2015/0074672 A1* | 3/2015 | Yeddanapudi | .......... | H04L 47/11 |
| | | | | 718/103 |

OTHER PUBLICATIONS

Polo et al. "Performance-Driven Task Co-Scheduling for MapReduce Environments", pp. 1-8.

* cited by examiner

*Primary Examiner* — Kenneth Tang
(74) *Attorney, Agent, or Firm* — Patterson + Sheridan, LLP

(57) ABSTRACT

Systems, methods, and computer program products to perform an operation comprising receiving a priority of a distributed computing job, an intermediate traffic type of the distributed computing job, and a set of candidate compute nodes available to process the distributed computing job, the candidate compute nodes each available to process at least one input split of the distributed computing job, and selecting a mapper node from the candidate compute nodes, for one of the input splits, wherein the mapper node is selected based on the priority and the intermediate traffic type of the distributed computing job, wherein the mapper compute node is further selected upon determining that the mapper node is not affected by an error, and a resource utilization score for the mapper node does not exceed a utilization threshold.

20 Claims, 7 Drawing Sheets

ADAPTIVE DATACENTER TOPOLOGY FOR DISTRIBUTED FRAMEWORKS JOB CONTROL THROUGH NETWORK AWARENESS

TECHNICAL FIELD

Aspects presented in this disclosure generally relate to distributed application frameworks. More specifically, aspects of this disclosure relate to adaptive datacenter topologies for distributed framework job control through network awareness.

BACKGROUND

Distributed application frameworks such as MapReduce process large data sets using a parallel, distributed algorithm on compute nodes in a cluster. The distributed framework may parse a job's input data into multiple split data sets, and distribute the splits to the compute nodes for processing. However, these frameworks treat the underlying network as a black box, and do not take network conditions into account when distributing the job across the cluster.

BRIEF DESCRIPTION OF THE DRAWINGS

So that the manner in which the above-recited features of the present disclosure can be understood in detail, a more particular description of the disclosure, briefly summarized above, may be had by reference to aspects, some of which are illustrated in the appended drawings. It is to be noted, however, that the appended drawings illustrate only typical aspects of this disclosure and are therefore not to be considered limiting of its scope, for the disclosure may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DESCRIPTION OF EXAMPLE EMBODIMENTS

Overview

Figure 1:
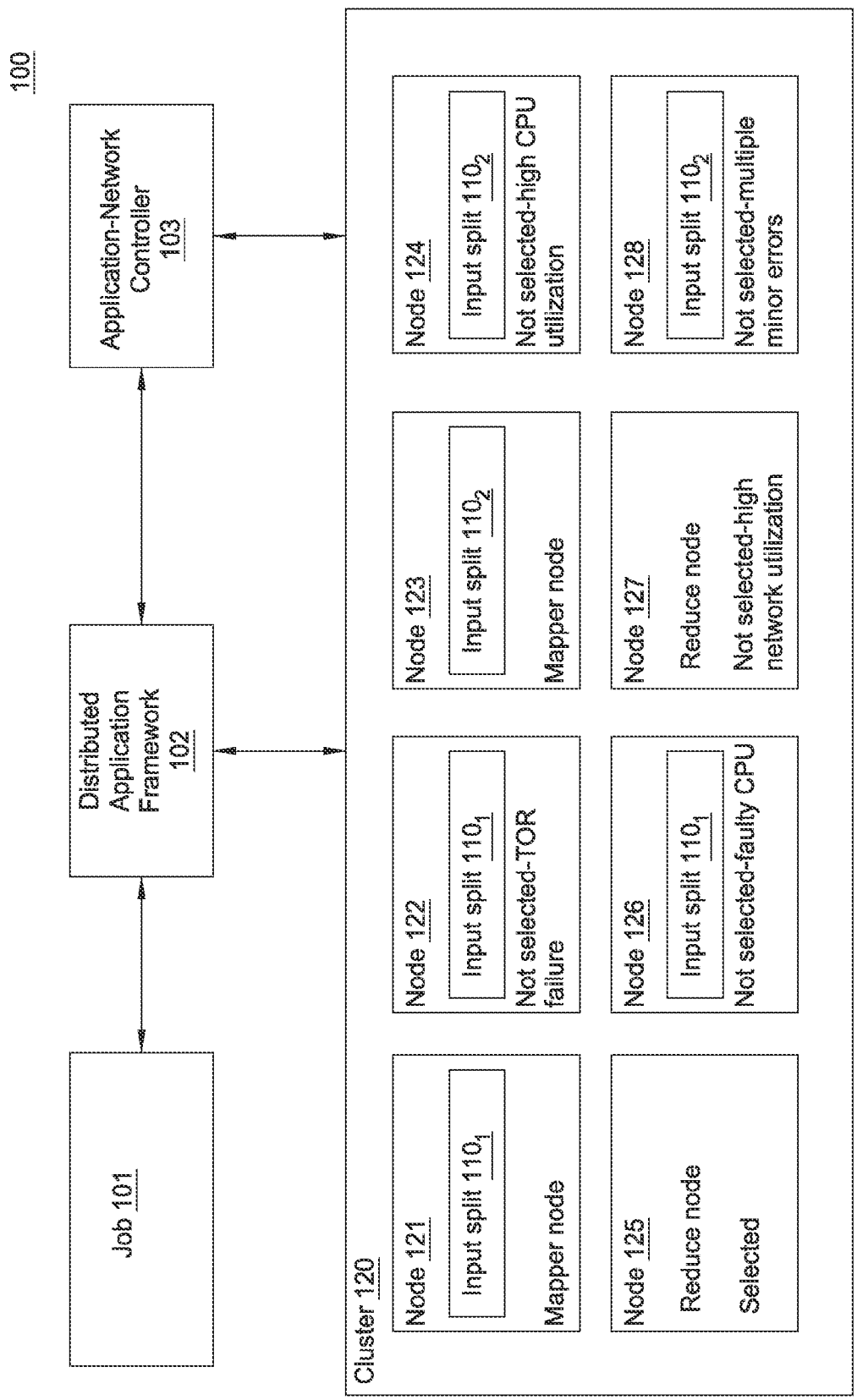
FIG. 1 illustrates techniques to provide adaptive datacenter topologies for distributed framework job control through network awareness, according to one aspect.

One aspect includes a method to perform an operation comprising receiving a priority of a distributed computing job, an intermediate traffic type of the distributed computing job, and a set of candidate compute nodes available to process the distributed computing job, the candidate compute nodes each available to process at least one input split of the distributed computing job, and selecting a mapper node from the candidate compute nodes, for one of the input splits, wherein the mapper node is selected based on the priority and the intermediate traffic type of the distributed computing job, wherein the mapper compute node is further selected upon determining that the mapper node is not affected by an error, and a resource utilization score for the mapper node does not exceed a utilization threshold.

Another aspect includes a system to perform an operation comprising receiving a priority of a distributed computing job, an intermediate traffic type of the distributed computing job, and a set of candidate compute nodes available to process the distributed computing job, the candidate compute nodes each available to process at least one input split of the distributed computing job, and selecting a mapper node from the candidate compute nodes, for one of the input splits, wherein the mapper node is selected based on the priority and the intermediate traffic type of the distributed computing job, wherein the mapper compute node is further selected upon determining that the mapper node is not affected by an error, and a resource utilization score for the mapper node does not exceed a utilization threshold.

Still another aspect includes a computer program product to perform an operation comprising receiving a priority of a distributed computing job, an intermediate traffic type of the distributed computing job, and a set of candidate compute nodes available to process the distributed computing job, the candidate compute nodes each available to process at least one input split of the distributed computing job, and selecting a mapper node from the candidate compute nodes, for one of the input splits, wherein the mapper node is selected based on the priority and the intermediate traffic type of the distributed computing job, wherein the mapper compute node is further selected upon determining that the mapper node is not affected by an error, and a resource utilization score for the mapper node does not exceed a utilization threshold.

Example Embodiments

Embodiments disclosed herein provide an adaptive network topology that identifies nodes in the network (or cluster) as being available (or at least suitable) to process part of a job in a distributed computing environment, while identifying other nodes in the network that are not available (or suitable) to process part of the job. Specifically, a controller evaluates current and planned resource utilization levels of each compute node in the cluster, the current health of the cluster, job priority, and an intermediate traffic type of the job when selecting one or more nodes in the cluster to process the job.

The current health of the cluster may reflect the health of all elements of the cluster, including, compute nodes, storage nodes, network elements, cables, and the like. If a node is affected by an error (such as failed memory within the compute node, or a severed network cable connecting the compute node to the cluster), the controller does not consider the node when scheduling a job for processing in the cluster. Similarly, if current or planned resource utilization levels of the node indicate that the node will be at 90% CPU utilization for the next 6 hours, the job controller does not consider the node when scheduling the job for processing. An intermediate traffic type may indicate whether the job's input is larger, smaller, or roughly equal to the output generated by the job. For example, a web crawler may output data from a set of web pages that is much greater in size than an input set of links to the web pages. As such, the controller treats the job's intermediate traffic type when deploying the job in the distributed computing cluster. Further still, the job's priority may influence which nodes are selected to process the job. For example, a high priority job may require the best available node (based on, for example, a score for each available node), while an available node (otherwise satisfying other criteria) may be selected at random lower priority job.

Note, embodiments presented herein are described using the Apache® Hadoop® framework as a reference example of a distributed application framework. Of course, one of ordinary skill in the art will recognize that other software frameworks or data analytics tools may be used. Similarly, one of skill in the art will recognize that embodiments may be adapted for use with a variety of parallel or distributed computing environments.

FIG. 1 illustrates a distributed computing environment 100 configured to provide adaptive datacenter topologies for distributed framework job control through network awareness, according to one aspect. The distributed computing environment 100 generally processes computing jobs in parallel on compute nodes in the cluster 120. As shown, the distributed computing environment 100 includes a cluster 120 of compute nodes, namely compute nodes 121-128. Although eight compute nodes are pictured, the cluster 120 may generally include any number of compute nodes.

The distributed application 102 framework may coordinate the placement of a job, such as the job 101, on one of the compute nodes. In at least one aspect, the distributed application 102 is implemented using a MapReduce framework, such as the Apache® Hadoop® framework. The job 101 may be any type of computing job, including a sort procedure performed on a data set, a word count performed on a data set, a web crawler which retrieves and stores the data from a set of specified uniform resource locators (URLs), and the like. The job 101 may be represented by a set of input splits $110_{1-2}$. An input split may be a portion of an input data file for the job 101. For example, if the input file (not pictured) of the job 101 is 1 gigabyte (GB) in size, the input file may be split into eight 128 megabyte (MB) input splits, each of which may be distributed and replicated across the compute nodes in the cluster 120. For the sake of clarity, the job 101 includes two input splits $110_{1-2}$, where each input split $110_1$, $110_2$ includes a portion of the input data for the job 101. Although depicted as being part of the job 101, in at least one embodiment, the input splits $110_1$, $110_2$. As shown, input split $110_1$ has been distributed and replicated to nodes 121, 122, and 126 in the cluster 120. Similarly, input split $110_2$ has been distributed and replicated to nodes 123, 124, and 128 of the cluster 120.

When the job 101 is scheduled for deployment, the distributed application framework 120 may determine a priority of the job 101 (which may be a default priority or may be user-specified), an intermediate traffic type of the job 101, and where the input splits $110_{1-2}$ reside in the cluster 120. An intermediate traffic type generally refers to a size of the output data generated by processing a job, relative to the size of the input data of the job. For example, the intermediate traffic type of the output data may exceed the size of the input data, such as in the case of a web crawler, be approximately the same as the input data (a sort function), or less than the input data (a word count). The distributed application framework 102 may determine the intermediate traffic type of the job 101 by any method, such as by comparing previous outputs relative to previous inputs of the same (or similar) jobs, analyzing code of the job 101, and the like. The distributed application framework 102 may use a scheduling algorithm to identify a list of candidate nodes in the cluster 120 available to process the job 101. Since the nodes in the cluster 120 may be homogenous (i.e., approximately equal in hardware and software configurations), nodes selected by the distributed application framework 102 may be equally suited to process the job 101 upon first glance. For example, the distributed application framework 102 may identify nodes 121-124, 126, and 128 as mapper nodes, while identifying nodes 125 and 127 as reducer nodes. A mapper node (also referred to as a map node) may be a node in a distributed computing environment that performs a map function, which may comprise filtering and sorting. The map function may generally take a series of key/value pairs, process each pair, and generate zero or more output key/value pairs. A reduce node (also referred to as a reducer node) in a distributed computing environment may perform a summary operation, such as combining the output of each map node in some way to form the output of the job 101. The use of the terms "map" node and "reduce" node herein should not be considered limiting of the disclosure, as the techniques described herein apply equally to any distributed computing environment.

However, the distributed application framework 102 may be unaware of factors in the cluster 120 which can impact processing performance of the distributed job. For example, the application framework 102 may not have general awareness of the health of the cluster, the current resource utilization of the compute nodes 121-128, and the currently planned resource utilization of the compute nodes 121-128. As such, network elements, compute nodes, and any other components in the cluster 120 communicate their health and resource utilization metrics to the application-network controller 103. Stated differently, the application-network controller 103 communicates with the networking components, servers, or compute nodes, and storage entities in the cluster 120, as well as with the distributed application framework 102 to maintain the most current consolidated information of the cluster 120. Generally, the application-network controller 103 may receive a list of nodes selected by the distributed application framework 102 and refine the received list to generate an adapted cluster topology for the job 101. In addition to the list of selected nodes, the distributed application framework 102 may provide the application-network controller 103 with an identifier of the job 101, a priority of the job 101, the intermediate traffic type of the job 101, and an indication of the nodes where input splits $110_{1-2}$ are present.

The application-network controller 103 may refine the list of received nodes from the distributed application framework 102 based on the health of the cluster 120 (including the compute nodes, storage nodes, network elements, or any other hardware or software component), the current (and planned) resource utilization of each node in the cluster 120, the priority of the job, the intermediate traffic type of the job, and a score computed for each node in the cluster 120.

Once the application-network controller 103 receives job information for scheduling, the application-network controller 103 may place the job into separate queues based on job priority. The application-network controller 103 may schedule higher priority jobs before lower priority jobs, although the priority of jobs may be changed at any time. The application-network controller 103 may then identify a set of candidate nodes, which may be all reduce nodes in the cluster 120 and any nodes which host (or have access to) an input split 110. In the example depicted in FIG. 1, the application-network controller 103 may identify nodes 125 and 127 as reducer nodes and nodes 121-124, 126, and 128 as hosting input splits 110. The application-network controller 103 may then determine whether the identified nodes are affected by major errors, such as faulty hardware, software crashes, and the like. The major errors may be directly associated with the nodes 121-128 themselves, or may stem from a source external to the nodes. For example, as shown, the application-network controller 103 may determine that node 122's top of rack (TOR) switch is faulty. In such a case, the application-network controller 103 may determine that node 112 is in an "impact zone" of the TOR switch affected by the major error. An impact zone is generally defined as a data path and/or all network elements (such as switches, routers, servers, storage, etc.) which are directly connected to a network element experiencing errors. The impact zone may be isolated, such as a port of a switch, which only affects those network elements directly connected to that port. The impact zone may also be more generic, such as in the case of a failed switch, which affects all network elements connected to the switch. The application-network controller 103 may therefore determine that node 122 is unreachable and is therefore, affected by a major error. As another example, the application-network controller 103 could determine that node 126 has a faulty CPU and is, therefore, affected by a major hardware error. When a node is affected by a major error, the application-network controller 103 may prune that node from a list of candidate nodes. Therefore, in the foregoing examples, the application-network controller 103 may prune nodes 122 and 126 from the set of candidate nodes, modifying the available topology of the cluster 120.

The application-network controller 103 may further place the node affected by a major error on a first "to be considered later" list. The application-network controller 103 may maintain two "to be considered later" lists, one list for nodes affected by major errors and a second list for nodes having high resource utilization levels (current or estimated future utilization) and/or multiple minor errors. A minor error may be an error or fault that degrades node performance, but does not render the node completely unusable or prevent a node from processing a given job. Therefore, as shown, the application-network controller 103 has not selected node 128, as the impact zone of the node (or the node itself) is affected by multiple minor errors.

The application-network controller 103 may also consider the current and estimated future resource utilization levels of each node in the cluster 120 when pruning nodes. If the node currently has a resource utilization level that exceeds a threshold, the application-network controller 103 may prune the node from the candidate nodes. Similarly, the application-network controller 103 may estimate the future resource utilizations of each node based on their processing status and job queues. If an estimated resource level exceeds a threshold, the application-network controller 103 may prune the node from the set of candidate nodes. For example, the application-network controller 103 may determine that node 124 has a high CPU utilization percentage. For example, node 128 may currently be running at 95% CPU utilization, where the threshold is 80%. Similarly, the application-network controller 103 may determine, based on the current job that node 128 is processing, that node 128 will remain at (or near) 95% CPU utilization for the next four hours. In such a case, the application-network controller 103 may prune node 128 from the set of candidate nodes for job 101. More generally, the application-network controller 103 may prune nodes for jobs having intermediate traffic types where the output data is greater than the input data or roughly the same as the input data. When a node is pruned for high current or estimated resource utilization level, the application-network controller 103 may place the node on the second "to be considered later" list.

Therefore, the application-network controller 103 may retain nodes in the candidate set of nodes that are not affected by major errors (or multiple minor errors) and that have acceptable current and estimated resource utilization levels. From this pruned list of candidate nodes, the application-network controller 103 may select one or more nodes based on the job's priority. For high priority jobs, the application-network controller 103 may select the "best" remaining node in the candidate set of nodes. The best remaining node may be determined by any method, including scoring each node based on the node's health and/or the node's resource utilization levels. The nodes may be scored by any suitable scoring algorithm, such as an algorithm weighting health, number of major and/or minor errors affecting the node, a hardware configuration of the node, and current and/or future resource utilization levels. For example, if the node is healthy, not affected by any errors, and has relatively low resource utilization levels, the node may receive a relatively high score. Similarly, the amount and type of hardware resources may affect the score for the node. For example, if node A has a faster CPU, more RAM, more storage capacity, and more network and/or I/O (input/output storage access) bandwidth than node B, then node A would have a higher score than node B (all else being equal).

For medium or low priority jobs, the application-network controller 103 may select a remaining node from the set of candidate nodes at random. If no nodes remain in the set of candidate nodes (i.e., all remaining nodes have previously been selected, or all candidate nodes were pruned), the application-network controller 103 may select a node from the second "to be considered later list." If the application-network controller 103 is still unable to select enough nodes, the application-network controller 103 may select a node from the first "to be considered later" list.

Continuing with the example in FIG. 1, the application-network controller 103 may determine that node 121 should be the mapper node for input split $110_1$, and that node 123 should be the mapper node for input split $110_2$.

The application-network controller 103 may follow a similar process to select reduce nodes for the job 101. Generally, the application-network controller 103 prunes reduce nodes that are affected by major errors, multiple minor errors, or have resource utilization levels (current or estimated future) that exceed predefined thresholds. Therefore, for example, the application-network controller 103 pruned node 127 from a list of candidate reducer nodes, as the application-network controller 103 determined that node 127 has current or expected future network utilization levels that exceed a predefined threshold. However, the application-network controller 103 determined that node 125 was a healthy reducer node, and selected node 125 as a reducer node for the MapReduce job. Once the application-network controller 103 selects the nodes, the job 101 may be processed to completion.

In addition, the application-network controller 103 may maintain a "preemption list" specifying nodes hosting jobs that may be preempted in favor of jobs having a higher priority. For example, the nodes added to the second "to be considered later" list may be added to the preemption list. The application-network controller 103 may preempt (or stop the execution of) lower priority jobs running on the nodes in the preemption list in favor of the job being currently deployed (job 101 in FIG. 1). If the preemption list includes a node being considered for job 101, the application-network controller 103 may determine whether to preempt the jobs currently executing on the node based on any factor, such as how close the job is to completion, how long the job has been running, how easy it would be to restart the job, and the like.

The application-network controller 103 may communicate with the nodes and network elements in the cluster 120 using any feasible techniques, such as OpenFlow®, simple network management protocol (SNMP), or OnePK. Furthermore, the functionality of the application-network controller 103 may be implemented as part of a standalone software defined networking application or as part of the management application 102.

Figure 2:
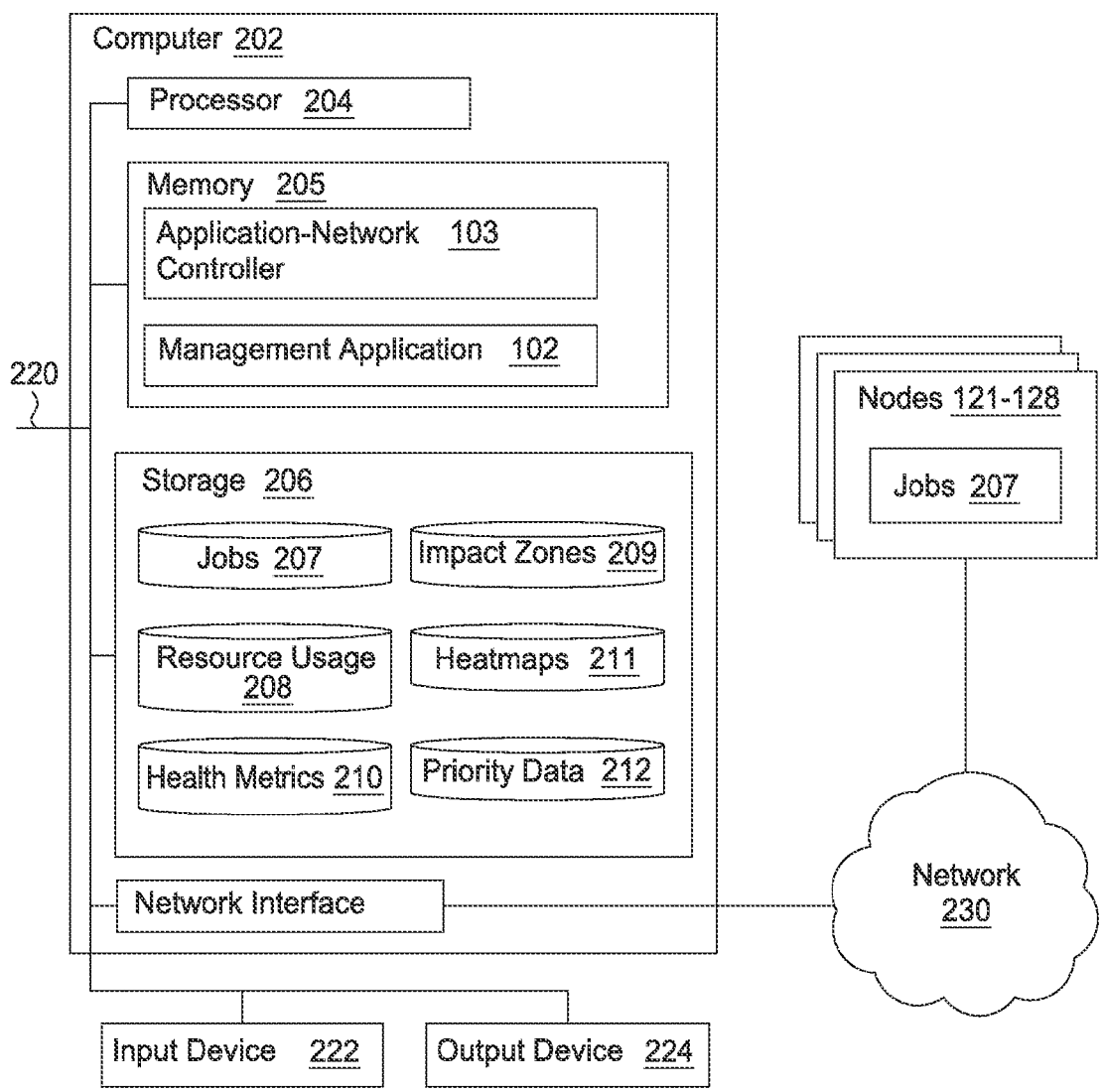
FIG. 2 illustrates a system to provide adaptive datacenter topologies for distributed framework job control through network awareness, according to one aspect.

FIG. 2 illustrates a system which provides adaptive datacenter topologies for distributed framework job control through network awareness, according to one aspect. The networked system 200 includes a computer 202 connected to other computers via a network 230. In general, the network 230 may be a telecommunications network and/or a wide area network (WAN). In a particular aspect, the network 230 is the Internet. In one aspect, the computer 202 is a networking element, such as a switch or a router configured to execute applications.

The computer 202 generally includes a processor 204 connected via a bus 220 to a memory 205, a network interface device 218, a storage 208, an input device 222, and an output device 224. The computer 202 is generally under the control of an operating system. Examples of operating systems include the UNIX® operating system, versions of the Microsoft® Windows® operating system, and distributions of the Linux® operating system. More generally, any operating system supporting the functions disclosed herein may be used. The processor 204 is included to be representative of a single CPU, multiple CPUs, a single CPU having multiple processing cores, and the like. The network interface device 218 may be any type of network communications device allowing the computer 202 to communicate with other computers via the network 230.

The storage 206 may be a persistent storage device. Although shown as a single unit, the storage 206 may be a combination of fixed and/or removable storage devices, such as fixed disc drives, solid state drives, SAN storage, NAS storage, removable memory cards or optical storage. The input device 222 may be any device for providing input to the computer 202. For example, a keyboard and/or a mouse may be used. The output device 224 may be any device for providing output to a user of the computer 202. For example, the output device 224 may be any conventional display screen or set of speakers. Although shown separately from the input device 222, the output device 224 and input device 222 may be combined. For example, a display screen with an integrated touch-screen may be used.

As shown, the memory 205 contains the application-network controller 103, which launches distributed computing jobs on compute nodes in a cluster based on the health of the cluster, current and future resource utilization levels of nodes in the cluster, job priority, and an intermediate traffic type of the job, as described above. The memory 205 also includes the management application 102, which may coordinate the placement of a distributed computing job 207 on compute nodes 121-128.

As shown, the storage 206 includes the jobs 207, the resource usage data 208, a set of impact zones 209, the health metrics 210, a heatmap 211, and a priority data 212. The jobs 207 is a data store including information about a plurality of distributed computing jobs, which may further include the application code for each of the jobs. The jobs 207 may include statistics related to each job, such as identifiers, estimated completion times, intermediate traffic types, estimated usage of different resources when processing the job on a node, historical metric utilization, and the like. The resource usage data 208 stores current and estimated resource utilization data for each of the nodes 120. For example, the resource usage data 208 may reflect that a first node is currently at an 80% utilization of its CPU, 50% of memory, and 100% of network bandwidth. Similarly, the application-network controller 103 may predict that the first node will continue experiencing these utilization levels for the next three hours and store this information in the resource usage 208. The resource usage data 208 may also include a resource profile of each node reflecting a current hardware configuration of each node (such as number and types of CPU, amount of memory, amount of storage, network connection, and I/O bandwidth). Generally, data regarding any metric or resource may be stored in the resource usage data 208.

Figure 6:
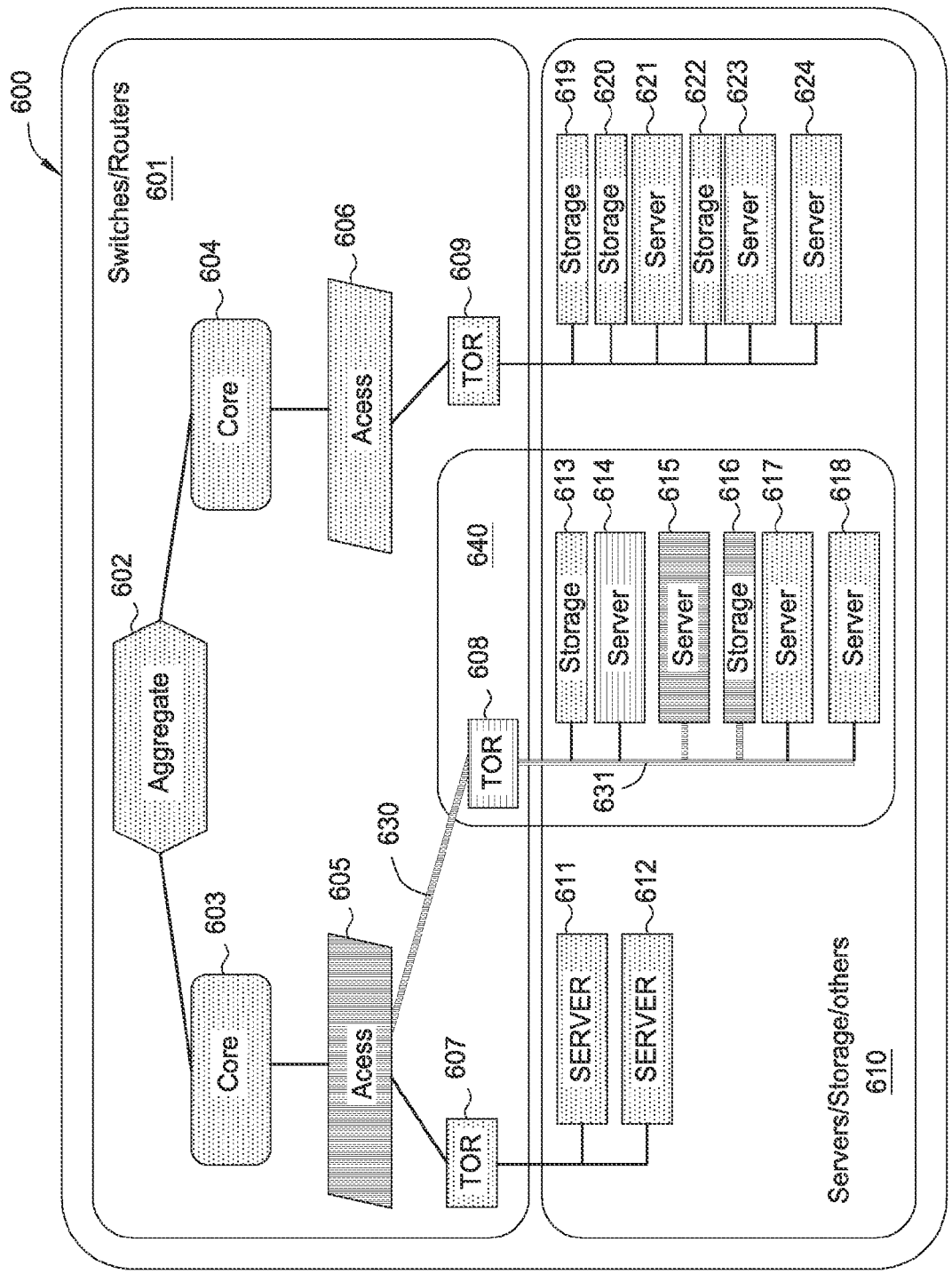
FIG. 6 illustrates a heat map, according to one aspect.

The impact zones 209 may include data related to compute nodes, storage nodes, network elements, or network connections that are currently affected by errors. If the same error affects multiple entities, these associations may be maintained in the impact zones 209. The heatmaps 211 includes data used by the application-network controller 103 to generate a heatmap reflecting the current state of the nodes, network elements, and other entities in the cluster 120. In at least one aspect, the heatmaps 211 also includes data of generated heatmaps. FIG. 6, discussed below, provides an example heatmap. The priority data 212 may include priority information for different users and/or groups of users. The priority data 212 may reflect, for example, that a lead developer or manager has a priority level of "High" or "3", while an intern has a priority level of "Low" or "1," while all programmers may have a priority level of "Medium" or "2." The priority levels 212 may include "default" and "maximum" priority levels. For example, "medium" may be the default priority level for the programmers, but the programmers may optionally modify their job priority to "high," which may be the maximum priority level for the programmers. Generally, the application-network controller 103 may use the priority information 212 when scheduling jobs 207. The priority information 212 may influence whether the jobs 207 of a given user are provided the best possible node or a node selected at random. Furthermore, the priority information 212 may determine whether one job may be preempted for another job having higher priority, as described in greater detail above.

Figure 3:
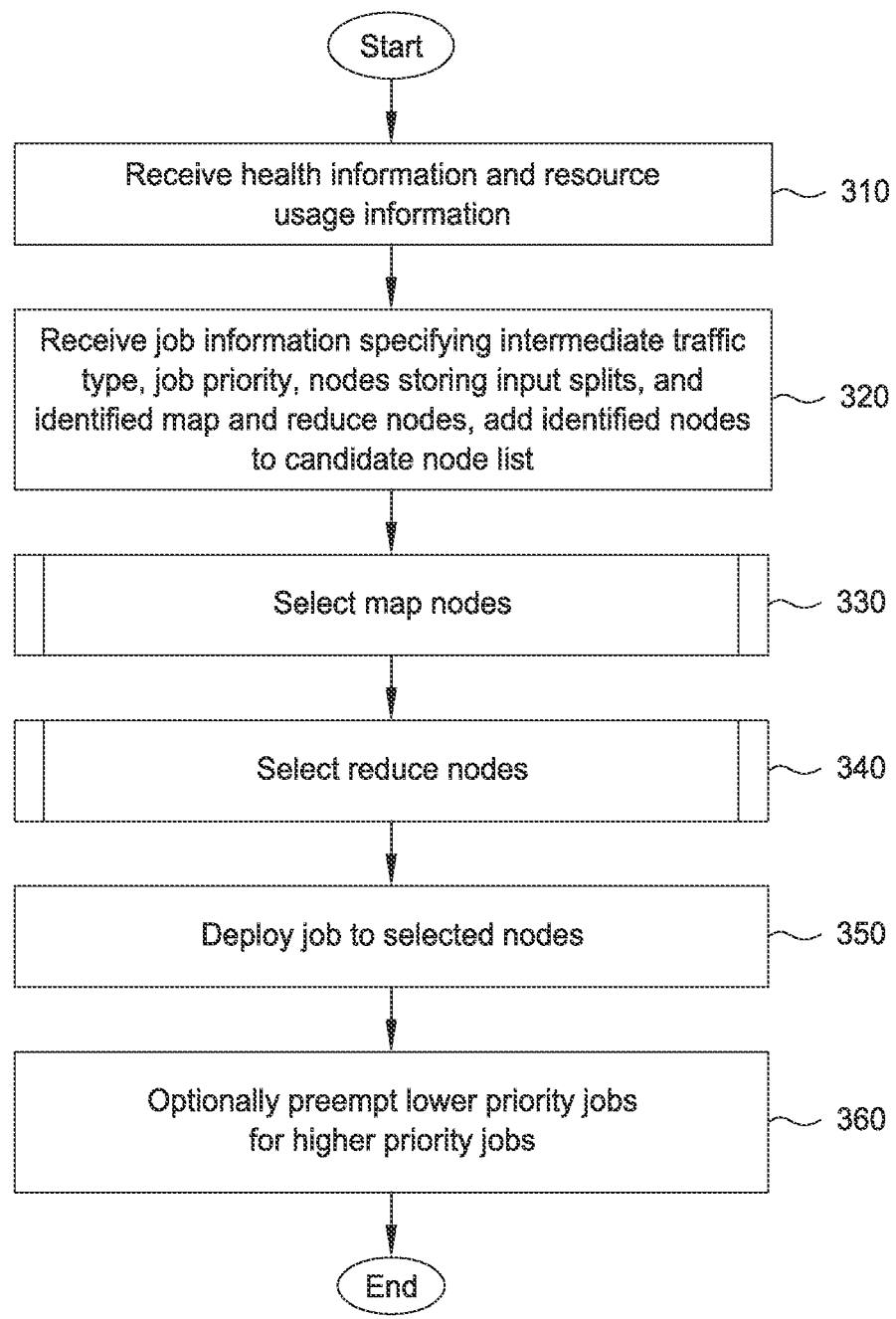
FIG. 3 illustrates a method to provide adaptive datacenter topologies for distributed framework job control through network awareness, according to one aspect.

FIG. 3 illustrates a method 300 to provide adaptive datacenter topologies for distributed framework job control through network awareness, according to one aspect. Generally, the steps of the method 300 select nodes to process a distributed computing job based on health metrics, current and estimated future resource utilization levels, job priority, and an intermediate traffic type of the job. At step 310, the application-network controller 103 may receive health and resource usage information from entities in the distributed computing environment. The health information may reflect the health status of different networking elements (such as switches, routers), compute nodes, storage nodes, links, and other entities in the distributed computing environment. The resource usage information may reflect utilization information reported elements of the distributed computing environment. For example, a top of rack (TOR) switch may indicate that 95% of its network bandwidth is currently being used, while a storage node may report that 100% of its I/O bandwidth is being used, while a compute node may report resource usage of 40% for a CPU and 20% of memory.

At step 320, the application-network controller 103 may receive job information from the management application 102. The job may be any type of distributed computing application, such as a MapReduce job. The job information may include an intermediate traffic type of the job, a priority level of the job, any nodes in the cluster currently storing input splits for the job, and candidate map and/or reduce nodes selected by the management application 102. At step 330, the application-network controller 103 may select map nodes on which to launch the distributed compute job. Generally, the application-network controller 103 may select map nodes based on the resource utilization of each node, whether the nodes are affected by errors, the job priority, and the intermediate traffic type of the job. At step 340, the application-network controller 103 may select reduce nodes for the distributed compute job. Generally, the application-network controller 103 may select reduce nodes based on the resource utilization of each node, whether the nodes are affected by errors, the job priority, and the intermediate traffic type of the job. At step 350, the application-network controller 103 may deploy the job to the selected nodes. At step 360, the application-network controller 103 may optionally preempt lower priority jobs for higher priority jobs.

Figure 4:
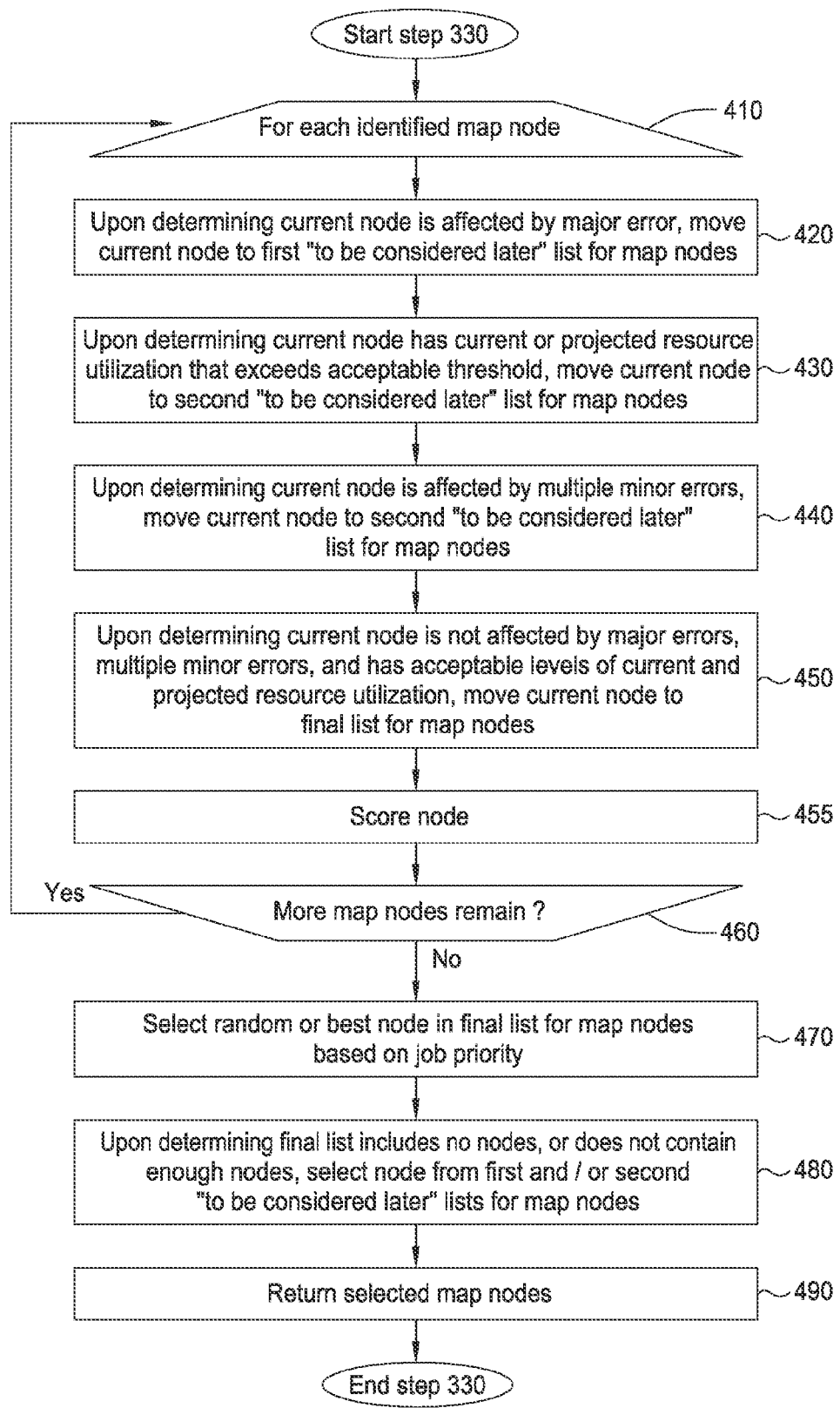
FIG. 4 illustrates a method to select map nodes, according to one aspect.

FIG. 4 illustrates a method 400 to select map nodes, according to one aspect. Method 400 further illustrates step 330 of method 300. Generally, the application-network controller 103 may perform the steps of the method 400 in order to modify the available network topology such that healthy nodes experiencing relatively low resource utilization are selected as map nodes ahead of nodes affected by errors or high resource utilization. At step 410, the application-network controller 103 may execute a loop including steps 420-460 for each map node identified by the management application 102 as a candidate map node to process the job. At step 420, the application-network controller 103 may move the current node to a first "to be considered later" list for map nodes upon determining that the current node is affected by a major error. The application-network controller 103 may determine that the current node is affected by a major error by referencing one or more of the impact zones 209, the health metrics 210, and the heatmaps 211. Similarly, the application-network controller 103 may attempt to communicate with the node. If the communication fails, or is otherwise delayed, the application-network controller 103 may determine that the node is affected by a major error. For example, if the current node is connected to a faulty port of a top of rack switch, the application-network controller 103 may determine that the current node is affected by a major error, as it may be unreachable. As such, the application-network controller 103 may remove the node from the candidate list of map nodes, and add the node to the first "to be considered later" list for map nodes.

At step 440, if the application-network controller 103 determines that the current node has a current or projected resource utilization levels that exceeds an acceptable threshold, then the controller 103 may remove the current node from the candidate list and add the current node to the second "to be considered later" list. For example, the application-network controller 103 may determine from the resource usage data 208 that the current node is utilizing 90% of its CPU, while the threshold may be 60%. Similarly, the application-network controller 103 may determine, by an analysis of the job's code (or resource metrics stored in previous executions of the job), that the job may use 70% of its CPU for the next three hours, exceeding the threshold. As such, the application-network controller 103 may remove the current node from the candidate list of map nodes, and add the current node to the second "to be considered later" list for map nodes. At step 450, the application-network controller 103 may move the current node to a final list for map nodes upon determining that the current node is healthy (i.e., not affected by major errors or multiple minor errors) and has acceptable levels of current and projected resource utilization (i.e., the levels of resource utilization do not exceed a resource utilization threshold). By adding healthy nodes having levels of resource utilization that do not exceed the utilization threshold, the application-network controller 103 may modify the network topology to only provide nodes that are best suited to process the MapReduce job. As described in greater detail below, the application-network controller 103 considers the nodes from the final list before considering the nodes from the two "to be considered later" lists, as the nodes in the final list are best suited to host the MapReduce job.

At step 455, the application-network controller 103 may score the current node based on one or more scoring criteria. The application-network controller 103 may implement any suitable scoring application to score the nodes relative to each other. For example, and without limitation, the application-network controller 103 may implement an algorithm that weighs the node's health (i.e., the number of major and minor errors affecting the node), the node's current resource utilization, the node's forecasted resource utilization, and the node's hardware configuration. As another example, a performance score may be generated for the node which reflects the hardware profile of the node (including hardware elements such as CPU type, RAM type/size, network bandwidth, I/O bandwidth), and a benchmark for the hardware profile. For example, the application-network controller 103 may run benchmarking tests on the CPU, RAM, or I/O on the node in order to determine the node's maximum throughput. Similarly, the application-network controller 103 may run an open benchmark on the CPU and/or RAM in order to determine the respective power profile of each component. Furthermore, the application-network controller 103 may determine the node's network oversubscription time, which considers whether the node's required network bandwidth exceeds available network bandwidth. Further still, the application-network controller 103 may run open benchmarks to calculate I/O power and I/O bandwidth. Based on these benchmarks, the application-network controller 103 may compute a performance score for the node. Generally, the application-network controller 103 may utilize any combination of any attributes (recited or otherwise) to generate a score for the node.

At step 460, the application-network controller 103 determines whether more candidate map nodes identified by the management application 102 remain to be considered. If more candidate map nodes remain, the application-network controller 103 returns to step 420 to score the remaining nodes. If no nodes remain, the application-network controller 103 proceeds to step 470, where the application-network controller 103 selects a random or best node in the final list for map nodes. The application-network controller 103 may select a random node or a best node based on the priority of the job and/or the intermediate traffic type of the job. If the job has high priority, the application-network controller 103 selects the best node from the final list for the job regardless of the intermediate traffic type. The best node may be determined by selecting the node with the highest score in the final list. If the job's priority is not high (or below a specified priority threshold), the application-network controller 103 may select a node from the final list at random. Additionally, if the job's intermediate traffic type indicates that the job's output produces less data than the job's input, the application-network controller 103 may consider nodes having high bandwidth utilization (current or forecasted) from the second "to be considered later list" when selecting a node at random, as the low volume of output by the job will likely not negatively affect the performance of the node experiencing high levels of bandwidth utilization. The application-network controller 103 may select random nodes for all but high-priority jobs in order to create a uniform placement of jobs on the nodes over time.

At step 480, the application-network controller 103 may select a node from the first "to be considered later" lists upon determining that the final list does not include any nodes (or not enough nodes). If no nodes remain in the first "to be considered later" list, the application-network controller 103 may select nodes in the second "to be considered later" list. The application-network controller 103 may select the node from the "to be considered later" lists based on the node's score (for example, to select the best node for a high priority job) or at random. The application-network controller 103 may repeat steps 470-480 in order to select a map node for each input split. At step 490, the application-network controller 103 may return the selected map nodes in order to schedule the selected map nodes to process the job.

Figure 5:
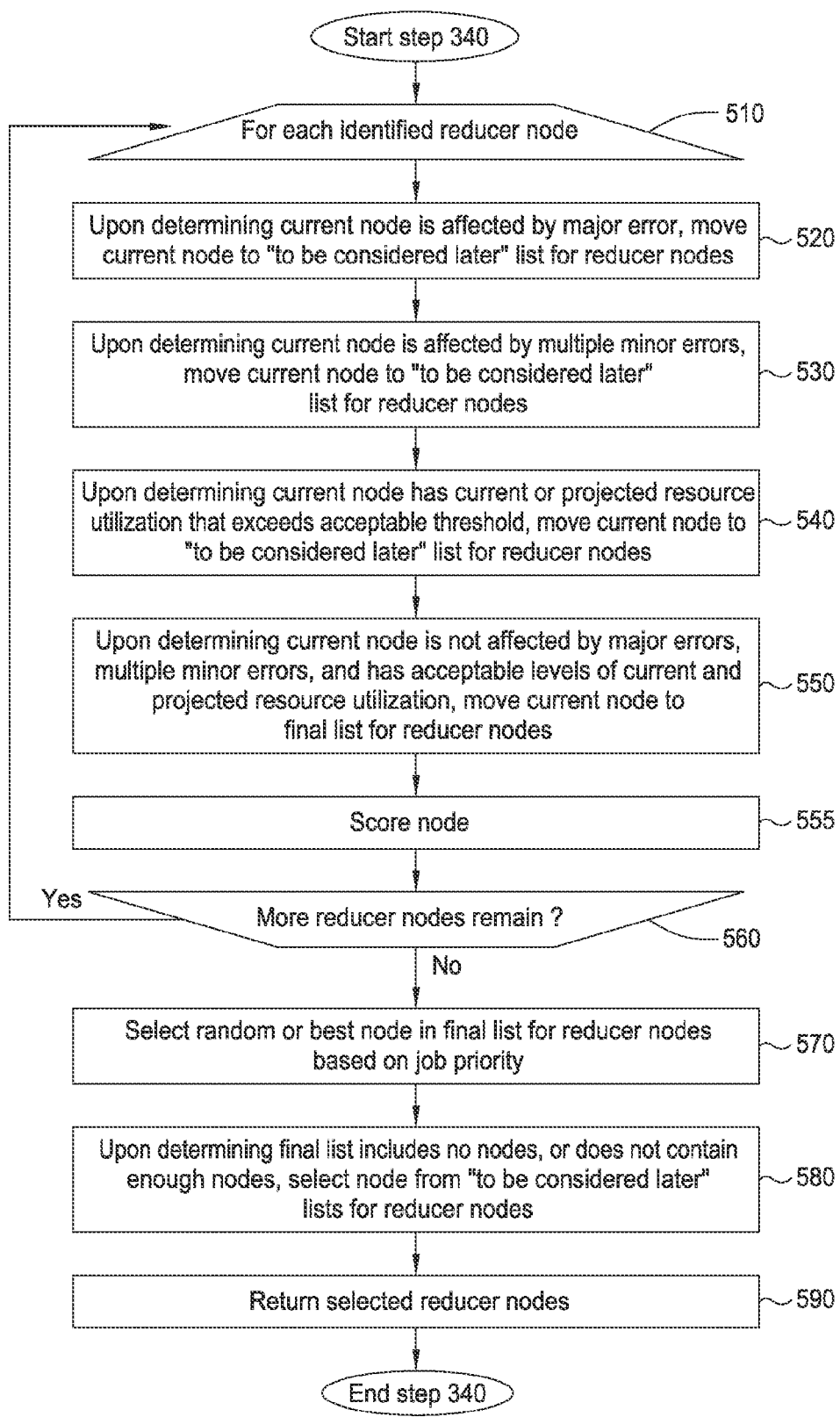
FIG. 5 illustrates a method to select reduce nodes, according to one aspect.

FIG. 5 illustrates a method 500 to select reduce nodes, according to one aspect. Method 400 further illustrates step 340 of method 300. Generally, the application-network controller 103 may perform the steps of the method 500 to modify the available network topology such that healthy nodes experiencing relatively low resource utilization are selected as reduce nodes ahead of nodes experiencing errors or high resource utilization. At step 510, the application-network controller 103 may execute a loop including steps 520-560 for each reduce node identified by the management application 102 as a candidate reduce node to process the job. At step 520, the application-network controller 103 may move the current node to a first "to be considered later" list for reduce nodes upon determining that the current node is affected by a major error. The application-network controller 103 may determine that the current node is affected by a major error by referencing one or more of the impact zones 209, the health metrics 210, and the heatmaps 211. Similarly, the application-network controller 103 may attempt to communicate with the node. If the communication fails, or is otherwise delayed, the application-network controller 103 may determine that the node is affected by a major error. For example, if the current node is connected to a faulty port of a top of rack switch, the application-network controller 103 may determine that the current node is affected by a major error, as it may be unreachable. As such, the application-network controller 103 may remove the node from the candidate list of reduce nodes, and add the node to the first "to be considered later" list for reduce nodes.

At step 540, the application-network controller 103 may remove the current node from the candidate list of reduce nodes and add the current node to the second "to be considered later" list upon determining that the current node has current or projected resource utilization levels that exceed acceptable thresholds. For example, the application-network controller 103 may determine from the resource usage data 208 that the current node is utilizing 90% of its CPU, while the threshold may be 60%. Similarly, the application-network controller 103 may determine, by an analysis of the job's code (or resource metrics stored in previous executions of the job), that the job may use 70% of its CPU for the next three hours, exceeding the threshold. As such, the application-network controller 103 may remove the current node from the candidate list of reduce nodes, and add the current node to the second "to be considered later" list for reduce nodes. At step 550, the application-network controller 103 may move the current node to a final list for reduce nodes upon determining that the current node is healthy (i.e., not affected by major errors or multiple minor errors) and has acceptable levels of current and projected resource utilization (i.e., the levels of resource utilization do not exceed a resource utilization threshold). By adding healthy nodes having levels of resource utilization that do not exceed the utilization threshold, the application-network controller 103 may modify the network topology to only provide nodes that are best suited to process the MapReduce job. As described in greater detail below, the application-network controller 103 considers the nodes from the final list before considering the nodes from the two "to be considered later" lists, as the nodes in the final list are best suited to host the MapReduce job.

At step 555, the application-network controller 103 may score the current node based on one or more scoring criteria. The application-network controller 103 may implement any suitable scoring application to score the nodes relative to each other. For example, and without limitation, the application-network controller 103 may implement an algorithm that weighs the node's health (i.e., the number of major and minor errors affecting the node), the node's current resource utilization, the node's forecasted resource utilization, and the node's hardware configuration. As another example, a performance score may be generated for the node which reflects the hardware profile of the node (including hardware elements such as CPU type, RAM type/size, network bandwidth, I/O bandwidth), and a benchmark for the hardware profile. For example, the application-network controller 103 may run benchmarking tests on the CPU, RAM, or I/O on the node in order to determine the node's maximum throughput. Similarly, the application-network controller 103 may run an open benchmark on the CPU and/or RAM in order to determine the respective power profile of each component. Furthermore, the application-network controller 103 may determine the node's network oversubscription time, which considers whether the node's required network bandwidth exceeds available network bandwidth. Further still, the application-network controller 103 may run open benchmarks to calculate I/O power and I/O bandwidth. Based on these benchmarks, the application-network controller 103 may compute a performance score for the node. Generally, the application-network controller 103 may utilize any combination of any attributes (recited or otherwise) to generate a score for the node.

At step 560, the application-network controller 103 determines whether more candidate reduce nodes identified by the management application 102 remain to be considered. If so, the application-network controller 103 returns to step 520 to score the remaining nodes. If no nodes remain, the application-network controller 103 proceeds to step 570, where the application-network controller 103 selects a random or best node in the final list for reduce nodes. The application-network controller 103 may select a random node or a best node based on the priority of the job and/or the intermediate traffic type of the job. If the job has high priority, the application-network controller 103 selects the best node from the final list for the job regardless of the intermediate traffic type. The best node may be determined by selecting the node with the highest score in the final list. If the job's priority is not high (or below a specified priority threshold), the application-network controller 103 may select a node from the final list at random. Additionally, if the job's intermediate traffic type indicates that the job's output produces less data than the job's input, the application-network controller 103 may consider nodes having high bandwidth utilization (current or forecasted) from the second "to be considered later list" when selecting a node at random, as the low volume of output by the job will likely not negatively affect the performance of the node experiencing high levels of bandwidth utilization. The application-network controller 103 may select random nodes for all but high-priority jobs in order to create a uniform placement of jobs on the nodes over time.

At step 580, if the application-network controller 103 determines that the final list does not include any nodes (or not enough nodes) then the controller 103 may select a node from the first "to be considered later" list. If no nodes remain in the first "to be considered later" list, the application-network controller 103 may select nodes in the second "to be considered later" list. The application-network controller 103 may select the node from the "to be considered later" lists based on the node's score (for example, to select the best node for a high priority job) or at random. The application-network controller 103 may repeat steps 570-580 in order to select a reduce node for each input split. At step 590, the application-network controller 103 may return the selected reduce nodes in order to schedule the selected reduce nodes to process the job.

FIG. 6 illustrates a network heatmap 600, according to one aspect. Generally, the application-network controller 103 may generate the heatmap 600 in order to allow users to visualize problem areas in a distributed computing environment. Similarly, the application-network controller 103 may use the underlying health data that is used to generate the heatmap 600 in order to modify the network topology when selecting nodes to process MapReduce jobs. For example, if a node is negatively affected by a faulty power supply, the application-network controller 103 may not select the node to process a job.

As shown, the heatmap 600 includes a section 601 for switches and routers, collectively referred to as network elements 602-609. As indicated by the diagonal lines, the access switch 605 is affected by a major error. The horizontal lines drawn on the top of rack (TOR) switch 608 indicate the TOR switch is experiencing minor problems. Similarly, the network connections 630 and 631 include lines to indicate the network paths are experiencing major problems. However, the network elements 602-604, 606-607, and 609 are not affected by any errors and have light dotted shading.

Similarly, the heatmap 600 includes a visualization of servers (or compute nodes), storage (or storage nodes), or other elements in the distributed computing environment. A set of such elements are depicted as items 611-624 in the heatmap 600. By marking the server 615 and storage node 616 with diagonal shading, the application-network controller 103 conveys that the items are affected by major problems. Similarly, the application-network controller 103 conveys that the server 614 is affected by minor problems based on the horizontal shading. The shaded region 640 may reflect the elements impacted by the error in the access switch 605, which includes the TOR switch 608, and storage nodes/servers 613-618. For example, the access switch 605 may have a faulty port, and those entities in the shaded region 640 may be connected through that port. As such, the heatmap 640 depicts the affected region 640 with shading to allow an administrator to identify the access switch 605 as the potential cause of the problems.

Figure 7:
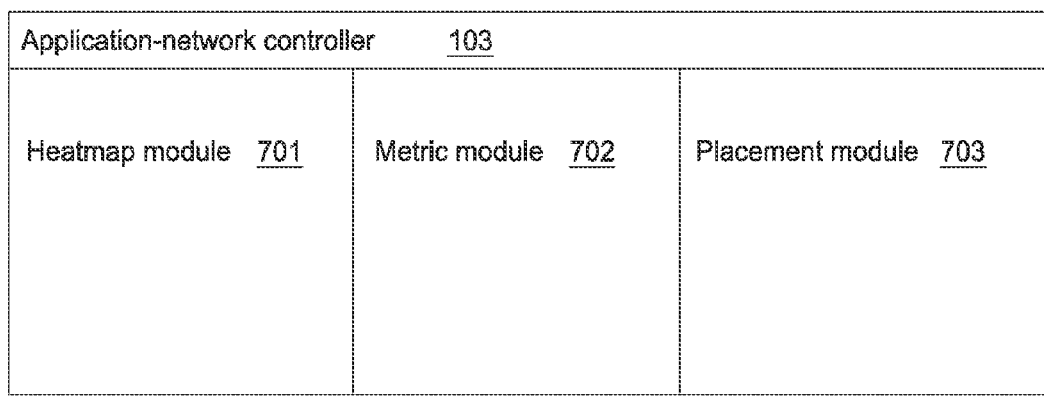
FIG. 7 illustrates components of an application-network controller, according to one aspect.

FIG. 7 illustrates components of the application-network controller 103, according to one aspect. As shown, the application-network controller 103 includes a heatmap module 701, a metric module 702, and a placement module 703. The heatmap module 701 is generally configured to generate heatmaps depicting the overall health of a distributed computing environment, such as the heatmap 600. The metric module 702 is generally configured to receive resource utilization metrics and health information from entities in the distributed computing environment, such as network elements, servers, and storage nodes. The metric module 702 is also further configured to estimate future resource usage by different entities in the distributed computing environment. For example, if a distributed application has decided to replicate different copies of data from node X to node Y, which requires that the data pass through a switch S, the metric module may estimate that the replication process may take a Z seconds to complete (based on the bandwidth of the switch S). Thus, the metric module 702 may determine the available bandwidth at the switch S until the replication process completes. Similarly, the metric module 702 may estimate available (or consumed) resources for other elements, such as CPU, memory, and I/O. For example, I/O utilization may be estimated based on the size of the data being copied to/from a node. If a node is copying a 1 TB file to a 4 TB drive with a 100 MBps I/O bandwidth, the metric module 702 may estimate that the transfer may take 10,000 seconds to complete. Therefore, other transfers to the 4 TB drive should be avoided during the 10,000 seconds required to complete the file transfer. More generally, the metric module 702 may perform the techniques described in U.S. patent application Ser. No. 14/327,385, which is incorporated herein by reference in its entirety. The placement module 703 is generally configured to select nodes to process distributed computing applications based on health metrics, resource utilization metrics, job priority, and an intermediate traffic type of the jobs, as described in greater detail above.

Advantageously, aspects disclosed herein introduce a network aware, adaptive datacenter topology for job placement and prioritization, allowing for better resource allocation and utilization by single or multiple distributed frameworks running in a distributed computing environment. Aspects select the nodes best suited to process jobs in the distributed computing environment based on whether nodes are affected by errors, node resource utilization (current and estimated future usage), job priority, and an intermediate traffic type of the job.

In the preceding, reference is made to aspects presented in this disclosure. However, the scope of the present disclosure is not limited to specific described aspects. Instead, any combination of the described features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the preceding aspects, features, aspects and advantages are merely illustrative and are not considered elements or limitations of the appended claims except where explicitly recited in a claim(s).

As will be appreciated by one skilled in the art, the aspects disclosed herein may be embodied as a system, method or computer program product. Accordingly, aspects may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to aspects presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Aspects of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the application-network controller 103 could execute on a computing system in the cloud and schedule jobs for execution on nodes in the cloud. In such a case, the application-network controller 103 could receive health and metric data from hardware elements in the cloud, and store the health and metric data at a storage location in the cloud. Doing so allows a user to access this information from any computing system attached to a network connected to the cloud (e.g., the Internet).

The flowchart and block diagrams in the Figures illustrate the architecture, functionality and operation of possible implementations of systems, methods and computer program products according to various aspects. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
receiving a priority of a distributed computing job and a set of candidate compute nodes available to process the distributed computing job, the candidate compute nodes each available to process at least one input split, of a plurality of input splits, wherein the plurality of input splits comprise a data input of the distributed computing job;
determining, based at least in part on a source code of the distributed computing job, that an intermediate traffic type of the distributed computing job is a first intermediate traffic type, of a plurality of intermediate traffic types, wherein the intermediate traffic type reflects a size of a data output generated by processing the distributed computing job relative to a size of the data input of the distributed computing job; and
selecting a first compute node of the candidate compute nodes as a mapper node for one of the input splits, wherein the first compute node is selected based on the priority and the intermediate traffic type of the distributed computing job and an overall score computed for the first candidate compute node, wherein the first compute node is further selected upon determining that:
the first compute node is not experiencing an error; and
a resource utilization score for the first compute node does not exceed a utilization threshold.

2. The method of claim 1, wherein the priority of the distributed computing job comprises a high priority job relative to other distributed computing jobs, wherein the first compute node is selected upon determining that the overall score for the first compute node exceeds an overall score of each other candidate compute node,
wherein the intermediate traffic type of the distributed computing type is further determined based on: (i) an intermediate traffic type of each of a plurality of previous executions of the distributed computing job, and (ii) an intermediate traffic type of each of a plurality of previous executions of other distributed computing jobs, the method further comprising:
computing the overall score for each of the plurality of candidate compute nodes based on: (i) a resource utilization score of the respective candidate compute node, (ii) a number of errors affecting the respective candidate compute node, (iii) a type of the errors affecting the respective candidate compute node, (iv) a hardware configuration of the respective candidate compute node, (v) a current level of utilization of system resources by the respective candidate compute node, and (vi) a forecasted level of utilization of the system resources by the respective candidate compute node; and
removing a second compute node from the set of candidate compute nodes upon determining the intermediate traffic type of the distributed computing job is the first intermediate traffic type, wherein the second compute node does not process any of the input splits of the distributed computing job.

3. The method of claim 1, wherein the error comprises at least one of a network error and an error of the first compute node, the method further comprising:
upon determining that the first compute node is experiencing the error:
removing the first compute node from the set of candidate compute nodes; and
selecting a second compute node, of the candidate compute nodes, for the first input split, wherein the second compute node is selected based on the priority and the intermediate traffic type of the distributed computing job, wherein the second compute node is further selected upon determining that:
the second compute node is not experiencing an error; and
a resource utilization score for the second compute node does not exceed the utilization threshold.

4. The method of claim 1, wherein the resource utilization score of the first compute node is less than the utilization threshold and greater than a minimum utilization threshold, wherein the first compute node is selected as the mapper node for the first input split upon further determining: (i) that each other candidate compute node is experiencing an error, and (ii) that the resource utilization score of each of the other candidate compute nodes exceeds the utilization threshold.

5. The method of claim 1, further comprising:
determining that a second compute node, of the plurality of compute nodes, is not experiencing an error;
determining that a resource utilization score of the second compute node does not exceed the utilization threshold; and
selecting the second node as a reduce node for the distributed computing job.

6. The method of claim 1, wherein the resource utilization score is based on: (i) a current level of utilization of system resources by the first compute node, and (ii) a forecasted level of utilization of the system resources by the first compute node, wherein the system resources comprise: (i) a processor (CPU), (ii) a network bandwidth, (iii) a memory, and (iv) a system input/output (I/O).

7. The method of claim 1, further comprising:
upon determining that a second input split for a different distributed computing job is being processed by the first compute node:
preempting the processing of the second input split by the first compute node; and
processing the first input split by the first compute node, wherein the distributed computing job has a greater priority than the different distributed computing job.

8. A system, comprising:
a computer processor; and
a memory containing a program, which when executed by the processor, performs an operation comprising:
receiving a priority of a distributed computing job and a set of candidate compute nodes available to process the distributed computing job, the candidate compute nodes each available to process at least one input split, of a plurality of input splits, wherein the plurality of input splits comprise a data input of the distributed computing job;

determining, based at least in part on a source code of the distributed computing job, that an intermediate traffic type of the distributed computing job is a first intermediate traffic type, of a plurality of intermediate traffic types, wherein the intermediate traffic type reflects a size of a data output generated by processing the distributed computing job relative to a size of the data input of the distributed computing job; and selecting a first compute node of the candidate compute nodes as a mapper node for one of the input splits, wherein the first compute node is selected based on the priority and the intermediate traffic type of the distributed computing job and an overall score computed for the first candidate compute node, wherein the first compute node is further selected upon determining that:

the first compute node is not experiencing an error; and a resource utilization score for the first compute node does not exceed a utilization threshold.

9. The system of claim 8, wherein the priority of the distributed computing job comprises a high priority job relative to other distributed computing jobs, wherein the first compute node is selected upon determining that an overall score for the first compute node exceeds an overall score of each other candidate compute node, wherein the intermediate traffic type of the distributed computing type is further determined based on: (i) an intermediate traffic type of each of a plurality of previous executions of the distributed computing job, and (ii) an intermediate traffic type of each of a plurality of previous executions of other distributed computing jobs, the operation further comprising:

computing the overall score for each of the plurality of candidate compute nodes based on: (i) a resource utilization score of the respective candidate compute node, (ii) a number of errors affecting the respective candidate compute node, (iii) a type of the errors affecting the respective candidate compute node, (iv) a hardware configuration of the respective candidate compute node, (v) a current level of utilization of system resources by the respective candidate compute node, and (vi) a forecasted level of utilization of the system resources by the respective candidate compute node; and removing a second compute node from the set of candidate compute nodes upon determining the intermediate traffic type of the distributed computing job is the first intermediate traffic type, wherein the second compute node does not process any of the input splits of the distributed computing job.

10. The system of claim 8, wherein the error comprises at least one of a network error and an error of the first compute node, the operation further comprising:

upon determining that the first compute node is experiencing the error:

removing the first compute node from the set of candidate compute nodes; and selecting a second compute node, of the candidate compute nodes, for the first input split, wherein the second compute node is selected based on the priority and the intermediate traffic type of the distributed computing job, wherein the second compute node is further selected upon determining that:

the second compute node is not experiencing an error; and a resource utilization score for the second compute node does not exceed the utilization threshold.

11. The system of claim 8, wherein the resource utilization score of the first compute node is less than the utilization threshold and greater than a minimum utilization threshold, wherein the first compute node is selected as the mapper node for the first input split upon further determining: (i) that each other candidate compute node is experiencing an error, and (ii) that the resource utilization score of each of the other candidate compute nodes exceeds the utilization threshold.

12. The system of claim 8, the operation further comprising:

determining that a second compute node, of the plurality of compute nodes, is not experiencing an error;

determining that a resource utilization score of the second compute node does not exceed the utilization threshold; and selecting the second node as a reduce node for the distributed computing job.

13. The system of claim 8, wherein the resource utilization score is based on: (i) a current level of utilization of system resources by the first compute node, and (ii) a forecasted level of utilization of the system resources by the first compute node, wherein the system resources comprise: (i) a processor (CPU), (ii) a network bandwidth, (iii) a memory, and (iv) a system input/output (I/O).

14. The system of claim 8, the operation further comprising:

upon determining that a second input split for a different distributed computing job is being processed by the first compute node:

preempting the processing of the second input split by the first compute node; and processing the first input split by the first compute node, wherein the distributed computing job has a greater priority than the different distributed computing job.

15. A computer program product, comprising:

a non-transitory computer-readable storage medium having computer-readable code embodied therewith, the computer-readable program code executable by a processor to perform an operation to optimize placement of a distributed computing job on a plurality of compute nodes, the operation comprising:

receiving a priority of a distributed computing job and a set of candidate compute nodes available to process the distributed computing job, the candidate compute nodes each available to process at least one input split, of a plurality of input splits, wherein the plurality of input splits comprise a data input of the distributed computing job;

determining, based at least in part on a source code of the distributed computing job, that an intermediate traffic type of the distributed computing job is a first intermediate traffic type, of a plurality of intermediate traffic types, wherein the intermediate traffic type reflects a size of a data output generated by processing the distributed computing job relative to a size of the data input of the distributed computing job; and selecting a first compute node of the candidate compute nodes as a mapper node for one of the input splits, wherein the first compute node is selected based on the priority and the intermediate traffic type of the distributed computing job and an overall score computed for the first candidate compute node, wherein the first compute node is further selected upon determining that:

the first compute node is not experiencing an error; and a resource utilization score for the first compute node does not exceed a utilization threshold.

16. The computer program product of claim 15, wherein the priority of the distributed computing job comprises a high priority job relative to other distributed computing jobs, wherein the first compute node is selected upon determining that an overall score for the first compute node exceeds an overall score of each other candidate compute node, wherein the intermediate traffic type of the distributed computing type is further determined based on: (i) an intermediate traffic type of each of a plurality of previous executions of the distributed computing job, and (ii) an intermediate traffic type of each of a plurality of previous executions of other distributed computing jobs, the operation further comprising:

computing the overall score for each of the plurality of candidate compute nodes based on: (i) a resource utilization score of the respective candidate compute node, (ii) a number of errors affecting the respective candidate compute node, (iii) a type of the errors affecting the respective candidate compute node, (iv) a hardware configuration of the respective candidate compute node, (v) a current level of utilization of system resources by the respective candidate compute node, and (vi) a forecasted level of utilization of the system resources by the respective candidate compute node; and removing a second compute node from the set of candidate compute nodes upon determining the intermediate traffic type of the distributed computing job is the first intermediate traffic type, wherein the second compute node does not process any of the input splits of the distributed computing job.

17. The computer program product of claim 15, wherein the error comprises at least one of a network error and an error of the first compute node, the operation further comprising:

upon determining that the first compute node is experiencing the error:

removing the first compute node from the set of candidate compute nodes; and selecting a second compute node, of the candidate compute nodes, for the first input split, wherein the second compute node is selected based on the priority and the intermediate traffic type of the distributed computing job, wherein the second compute node is further selected upon determining that:

the second compute node is not experiencing an error; and a resource utilization score for the second compute node does not exceed the utilization threshold.

18. The computer program product of claim 15, wherein the resource utilization score of the first compute node is less than the utilization threshold and greater than a minimum utilization threshold, wherein the first compute node is selected as the mapper node for the first input split upon further determining: (i) that each other candidate compute node is experiencing an error, and (ii) that the resource utilization score of each of the other candidate compute nodes exceeds the utilization threshold.

19. The computer program product of claim 15, the operation further comprising:

determining that a second compute node, of the plurality of compute nodes, is not experiencing an error;

determining that a resource utilization score of the second compute node does not exceed the utilization threshold; and selecting the second node as a reduce node for the distributed computing job.

20. The computer program product of claim 15, wherein the resource utilization score is based on: (i) a current level of utilization of system resources by the first compute node, and (ii) a forecasted level of utilization of the system resources by the first compute node, wherein the system resources comprise: (i) a processor (CPU), (ii) a network bandwidth, (iii) a memory, and (iv) a system input/output (I/O).

* * * * *